United States Patent
Takei et al.

(10) Patent No.: US 6,907,480 B2
(45) Date of Patent: Jun. 14, 2005

(54) DATA PROCESSING APPARATUS AND DATA INPUT/OUTPUT APPARATUS AND DATA INPUT/OUTPUT METHOD

(75) Inventors: Toshiki Takei, Okaya (JP); Hiroaki Kasuga, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 272 days.

(21) Appl. No.: 10/109,341

(22) Filed: Mar. 28, 2002

(65) Prior Publication Data

US 2003/0014570 A1 Jan. 16, 2003

(30) Foreign Application Priority Data

Jul. 11, 2001 (JP) ........................................ 2001-210903

(51) Int. Cl.$^7$ .................................................. G06F 3/00
(52) U.S. Cl. .............................. 710/52; 710/5; 710/35; 709/213
(58) Field of Search .................. 710/5, 7, 20–22, 710/33, 35, 52, 53; 365/189.05, 230.05; 709/212, 213

(56) References Cited

U.S. PATENT DOCUMENTS

| | | | | |
|---|---|---|---|---|
| 4,866,597 A | * | 9/1989 | Kinoshita | 709/214 |
| 5,537,639 A | * | 7/1996 | Matsumoto et al. | 709/232 |
| 5,623,611 A | * | 4/1997 | Matsukawa et al. | 710/52 |
| 5,948,060 A | * | 9/1999 | Gregg et al. | 709/212 |
| 6,307,860 B1 | * | 10/2001 | Joffe et al. | 370/412 |
| 6,345,332 B1 | * | 2/2002 | Okazaki | 710/106 |
| 6,691,190 B1 | * | 2/2004 | Burroughs et al. | 710/100 |

FOREIGN PATENT DOCUMENTS

| | | |
|---|---|---|
| CN | 1295685 | 5/2001 |
| JP | 61-54556 | 3/1986 |
| JP | 1-297758 | 11/1989 |
| JP | 6-175980 | 6/1994 |
| JP | 7-306840 | 11/1995 |
| WO | WO 99/66392 | 12/1999 |

\* cited by examiner

*Primary Examiner*—Kim Huynh
*Assistant Examiner*—Eron Sorrell
(74) *Attorney, Agent, or Firm*—Rosalio Haro

(57) ABSTRACT

A data processing system enables faster exchange of data between data processing units having a CPU, and simplifies the writing of a data exchange program for the data processing units. A data processing apparatus 3 has a communication unit 4 with a first storage unit 31 and a second storage unit 32. The first storage unit 31 is used for sending data from the first data processing unit 1 to the second data processing unit 2. The second storage unit 32 is used for sending data from the second data processing unit 2 to the first data processing unit 1. Data can therefore be asynchronously exchanged between the data processing units without coordinating control of CPU operations in the data processing units, and control of data communication between the data processing units is simplified.

29 Claims, 13 Drawing Sheets

DATA PROCESSING APPARATUS AND DATA INPUT/OUTPUT APPARATUS AND DATA INPUT/OUTPUT METHOD

BACKGROUND OF THE INVENTION

1. Field of the Invention

The present invention relates to technology for exchanging data between CPUs in a data processing apparatus having multiple CPUs.

2. Description of the Related Art

Data must be exchanged between CPUs in a data processing apparatus having multiple CPUs (referred to below as a multiprocessor data processing apparatus) in order to, for example, transfer command data or the data to be processed between the multiple CPUs.

Data is generally transferred over a bus. However, when multiple CPUs share a bus, transferring data between CPUs over the bus is inefficient because one CPU cannot access the bus when another CPU is using the bus, and the advantage of using multiple CPUs is thus lost. Registers, buffer memory, or similar means are therefore preferably used for data transfers in such cases. In this case, however, it is necessary to coordinate CPU operation in order to prevent different CPUs from writing data to the buffer at the same time, and to prevent one CPU from overwriting data in the buffer before another CPU has read the data, or before the other CPU writes data to the buffer. Multiple CPUs sharing a common buffer must therefore read and write data to the buffer using appropriate timing, and data transfers between CPUs sharing the buffer must be cooperatively controlled.

Control signals for adjusting this timing must therefore be exchanged between the multiple CPUs, and the CPU controller program must be written so that both CPUs input and output data using appropriate timing based on these control signals. The program thus becomes more complex due to the increased number of factors to be considered when writing the program. It may also be necessary for one CPU to wait for another CPU's process to end in order to prevent data loss when there are competing requests for data input/output (I/O), and the potential for a drop in processing speed is therefore great.

SUMMARY OF THE INVENTION

The present invention is directed to a solution for these problems, and an object of the invention is to provide a data processing apparatus and a data input/output method that enable high speed data transfers between multiple CPUs and make it simple to write each CPU program.

To achieve this object the present invention enables data exchange between data processing units through an intervening communication means comprising a first storage means and a second storage means. This first storage means is write-only for a first data processing unit having a first CPU and read-only for a second data processing unit having a second CPU. The second storage means is read-only for the first data processing unit and write-only for the second data processing unit. In other words, a data processing apparatus according to the present invention has a first data processing unit having a first CPU; a second data processing unit having a second CPU; and a communication means enabling data exchange between the first and second data processing units. The communication means has a first storage means used for sending data from the first data processing unit to the second data processing unit, and a second storage means used for sending data from the second data processing unit to the first data processing unit. This architecture enables the data input/output method of this invention to be used so that the first storage means is used to send data from the first data processing unit to the second data processing unit, and the second storage means is used to send data from the second data processing unit to the first data processing unit.

With the data processing apparatus of this invention the first and second CPUs can simultaneously input and output data even when the first and second CPUs compete to input/output data to each other. It is therefore possible to output data to the other CPU even before that CPU reads previously transferred data, and data transfer freedom is significantly improved. It is therefore possible to provide a first signal output means or step for sending a signal to the second CPU when data is written to the first storage means, and sending a signal to the first CPU when data is read from the first storage means; and a second signal output means or step for sending a signal to the first CPU when data is written to the second storage means, and sending a signal to the second CPU when data is read from the second storage means. Data can thus be exchanged between the first and second CPU by inputting or outputting the desired data to the first and second storage means based on the signals sent to each CPU.

It is therefore possible for the CPUs to exchange data without coordinating control of the respective processor operations by appropriately inputting or outputting data to the first and second storage means of the communication means. Programming the CPUs is therefore easier, and processing speed can be improved because data input and output need not wait for the other CPU.

Preferably, the first storage means has a first buffer for transferring bulk data and a second buffer for transferring command data from the first data processing unit to the second data processing unit; and the second storage means comprises a third buffer for transferring bulk data and a fourth buffer for transferring command data from the second data processing unit to the first data processing unit. Because bulk data is bigger than command data, the first and third buffers used for bulk data transfers are preferably buffers with a relatively large storage capacity, and the second and fourth buffers for transferring command data are preferably buffers with a relatively small storage capacity.

The CPUs of the data processing units can detect the type of data being sent by simply knowing the buffer used for the data transfer by thus providing buffers with different applications and capacities in the first and second storage means, and using the buffers according to the type of data to be sent. The data processing apparatus or data input/output method of the invention therefore preferably has a first management means or step for sending a signal to the second CPU when data is written to the first buffer, and sending a signal to the first CPU when data is read from the first buffer; a second management means or step for sending a signal to the second CPU when data is written to the second buffer, and sending a signal to the first CPU when data is read from the second buffer; a third management means or step for sending a signal to the first CPU when data is written to the third buffer, and sending a signal to the second CPU when data is read from the third buffer; and a fourth management means or step for sending a signal to the first CPU when data is written to the fourth buffer, and sending a signal to the second CPU when data is read from the fourth buffer. Each CPU can therefore recognize the type of data being sent even when information from the sending CPU is not received and the CPU has not interpreted all of the transferred data. Even if the CPUs interpret command data sent via the second and fourth buffers, a process whereby the CPUs interpret bulk data transferred via the first and third buffers can be omitted, and the process specified by the command data, for example, can be applied to the bulk data.

It is therefore not necessary for the data processing units to interpret all data exchanged between the first and second data processing units, and data transfer performance can be improved. Furthermore, because it is not necessary to interpret the transferred data, the load on the receiving CPU can be reduced and the total processing speed can be further improved.

A good example of a data processing apparatus according to the present invention able to easily transfer bulk data is a data input/output apparatus having a first data input/output means able to input and/or output data and a second data input/output means able to input and/or output data. Multifunction devices combining a printer for printing checks and a scanner for capturing an image of the printed check are being developed for use in the POS systems industry. If the data input/output apparatus of the invention is applied to such a multifunction device, printer and scanner status data and operating commands for operating the mechanical components, as well as such bulk data as images of the checks captured by the scanner and the print data for the printer, can be exchanged quite efficiently between separate data processing units each having a CPU for controlling the printer or scanner, and CPU processing efficiency can be assured.

The processes whereby the first and/or second data processing unit inputs or outputs bulk data to the first buffer and input or output bulk data to the third buffer can run even faster using DMA. The first or second CPU can be used as the DMA controller, or a DMAC can be disposed in the first or second data processing unit. If an external interface is disposed to either the first or second data processing unit, data input or output by the first or second data input/output means using these buffers can be input or output through the external interface.

If the second data processing unit has an external interface, the data managed by the first data processing unit, that is, data obtained by the first data input/output means, can be output through the external interface by DMA transfer of bulk data from the first data processing unit to the first buffer and DMA transfer of bulk data from the first buffer to the external interface. Furthermore, the data managed by the first data processing unit, that is, data output by the first data input/output means, can be input through the external interface by DMA transfer of bulk data from the external interface to the third buffer and DMA transfer of bulk data from the third buffer to the first data processing unit.

This is also the case when the first data processing unit has an external interface. That is, data can be supplied through the external interface to the second data input/output means by DMA transfer of bulk data from the external interface to the first buffer and DMA transfer of bulk data from the first buffer to the second data processing unit. Data obtained by the second data input/output means can also be output through the external interface by DMA transfer of bulk data from the second data processing unit to the third buffer and DMA transfer of bulk data from the third buffer to the external interface.

Furthermore, if the first or third buffer has the same storage capacity as the send or receive buffer when an external interface is also provided, controlling the external interface and controlling the buffers of the communication means can be designed the same way.

It is therefore possible to provide a multifunctional device suited to handling checks in a POS system as noted above by using a printer or other means for printing to paper as the first data input/output means, and using a scanner or other means for capturing image data from paper as the second data input/output means.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
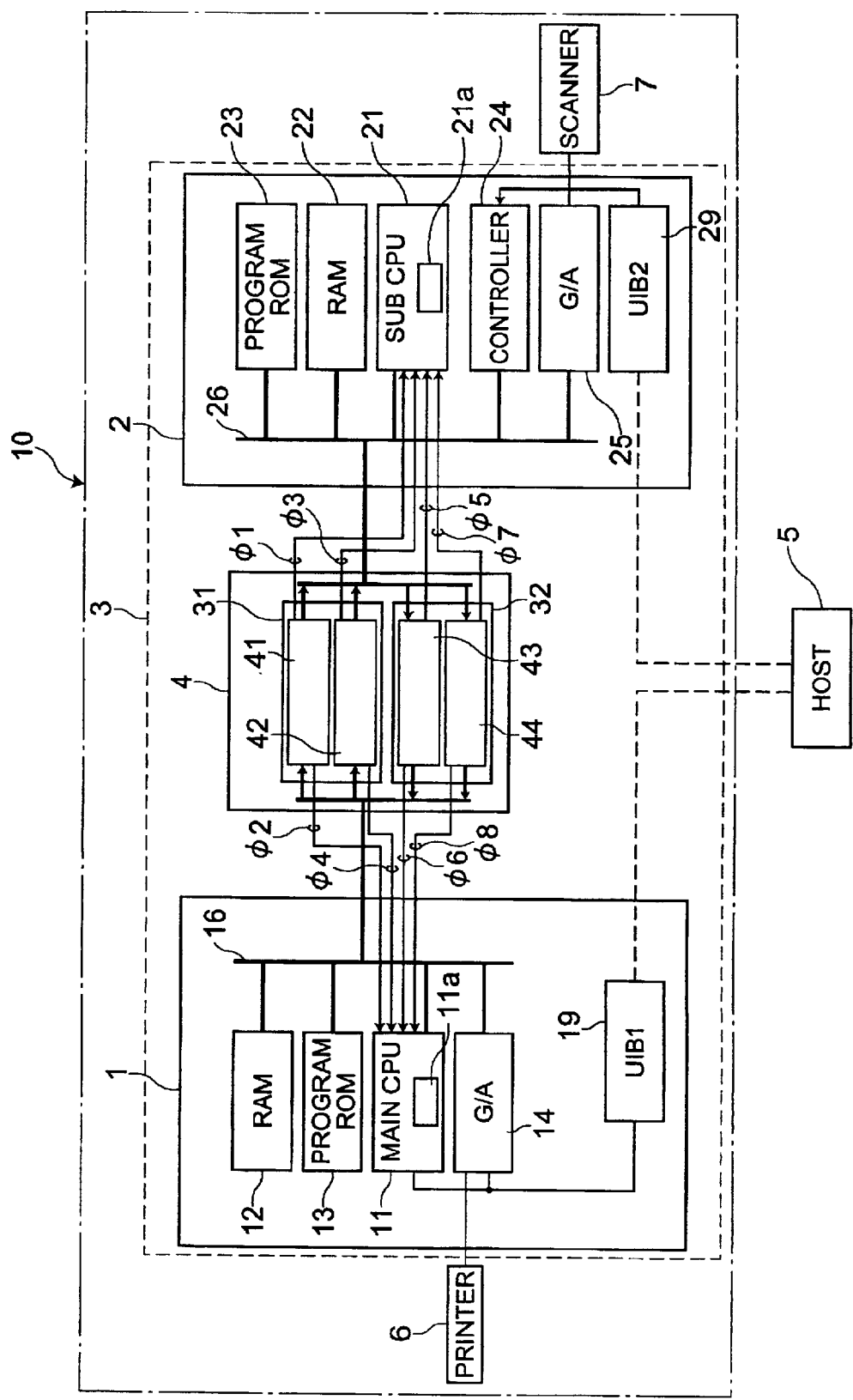
FIG. 1 is a schematic diagram of a POS printer having a data processing apparatus according to the present invention.

A preferred embodiment of the present invention is described below with reference to the accompanying figures. FIG. 1 shows a data processing apparatus according to the present invention and a data I/O unit comprising the data processing apparatus. The data I/O unit 10 in this example is a combined printer and scanner (or a POS printer or other multifunction device) for handling personal checks in a POS system.

This multifunction device 10 has a printing mechanism (printer) 6 as the first data I/O means for printing the date and amount information to the front of the check, and a scanner mechanism (scanner) 7 as the second data I/O means for capturing an image of the check printed with the above date and amount data. The multifunction device 10 also has a data processing apparatus 3 according to the present invention for controlling the printer 6 and scanner 7.

The data processing apparatus 3 has a first data processing unit 1 for controlling the printer 6, a second data processing unit 2 for controlling the scanner 7, and a communication unit 4 for handling data transfers between the first data processing unit 1 and second data processing unit 2.

The multifunction device 10 of this embodiment operates as a peripheral device of a personal computer 5 used as the POS machine or host machine. The data processing apparatus 3 therefore has an interface for sending and receiving data to and from host 5, receives command data from the host 5 for controlling the printer 6 and scanner 7, obtains the print data for printing with the printer 6 from the host 5, and sends the image data produced by the scanner 7 to the host 5. An interface 19 and 29 is therefore separately disposed to both the first data processing unit 1 and second data processing unit 2, which are used by selecting the appropriate interface.

The first data processing unit 1 has a main CPU 11 for controlling the printer 6, program ROM 13 storing the program executed by the main CPU 11, RAM 12 such as SRAM or DRAM used as working memory by the main CPU 11 and for recording data, a gate array 14 containing a drive circuit for controlling the printer 6 under the direction of main CPU 11, and an external interface (UIB1) 19 to the host 5. The main CPU 11, program ROM 13, RAM 12, and gate array 14 are connected by a bus 16 including a data bus and an address bus.

The second data processing unit 2 has a sub CPU 21 for controlling the scanner 7, program ROM 23 storing the program executed by the sub CPU 21, RAM 22 such as SRAM or DRAM used as working memory by the sub CPU 21 and for recording data, an external interface (UIB1) 29 to the host 5, an interface controller 24 such as a USB controller for controlling the external interface 29, and a gate array 25 containing a drive circuit for controlling the scanner 7 as controlled by the sub CPU 21. The sub CPU 21, program ROM 23, RAM 22, gate array 25, and interface controller 24 are connected by a bus 26 including a data bus and an address bus.

The communication unit 4 handling data communication between the data processing units 2 and 3 has a first storage unit 31 and a second storage unit 32 to which the bus 16 of first data processing unit 1 and the bus 26 of the second data processing unit 2 are coupled.

The first storage unit 31 is used for sending data from the first data processing unit 1 to the second data processing unit 2, and the second storage unit 32 is used for sending data from the second data processing unit 2 to the first data processing unit 1.

The first storage unit 31 also has a four-byte first buffer 41 for passing bulk data such as printer 6 status data from the first data processing unit 1 to the second data processing unit 2, and a one-byte second buffer 42 for transferring command data such as error commands from the printer 6 and scanner 7 commands received from the host.

The second storage unit 32 has an eight-byte third buffer 43 for sending bulk data for printing on the printer 6 from the host 5 to the first data processing unit 1 by way of the second data processing unit 2, and a one-byte fourth buffer 44 for sending printer 6 command data from the host 5.

The communication unit 4 of this embodiment comprises a communication unit 33 having the first and second storage units 31 and 32, a bus interface 34 for interfacing with bus 16 of first data processing unit 1, and a bus interface 35 for interfacing with bus 26 of second data processing unit 2. The buffers 41 to 44 of the first and second storage units 31 and 32 are coupled through bus interface 34 and bus interface 35 to bus 16 of first data processing unit 1 and bus 26 of second data processing unit 2.

Addresses for reading and writing data to the buffers 41 to 44, a chip select signal CE for selecting one of the buffers 41 to 44, and write signal WR and read signal RD for writing and reading data to the selected buffer are supplied through bus interface 34 to the communication unit 33 from main CPU 11, and the communication unit 33 outputs write-enable interrupt signals ($\phi 2$, $\phi 4$) and read-enable interrupt signals ($\phi 6$, $\phi 8$) to the main CPU 11.

Addresses for reading and writing data to the buffers 41 to 44, a chip select signal CE for selecting one of the buffers 41 to 44, and write signal WR and read signal RD for writing and reading data to the selected buffer are supplied through bus interface 35 to the communication unit 33 from sub CPU 21, and the communication unit 33 outputs write-enable interrupt signals ($\phi 5$, $\phi 7$) and read-enable interrupt signals ($\phi 1$, $\phi 3$) to the sub CPU 21.

In order to store data based on these signals, each of the buffers 41 to 44 has a memory block 51, 71, 61, 75 for storing data, and a management block 59, 72, 69, 76 for managing the respective memory block based on the signals.

Figure 2:
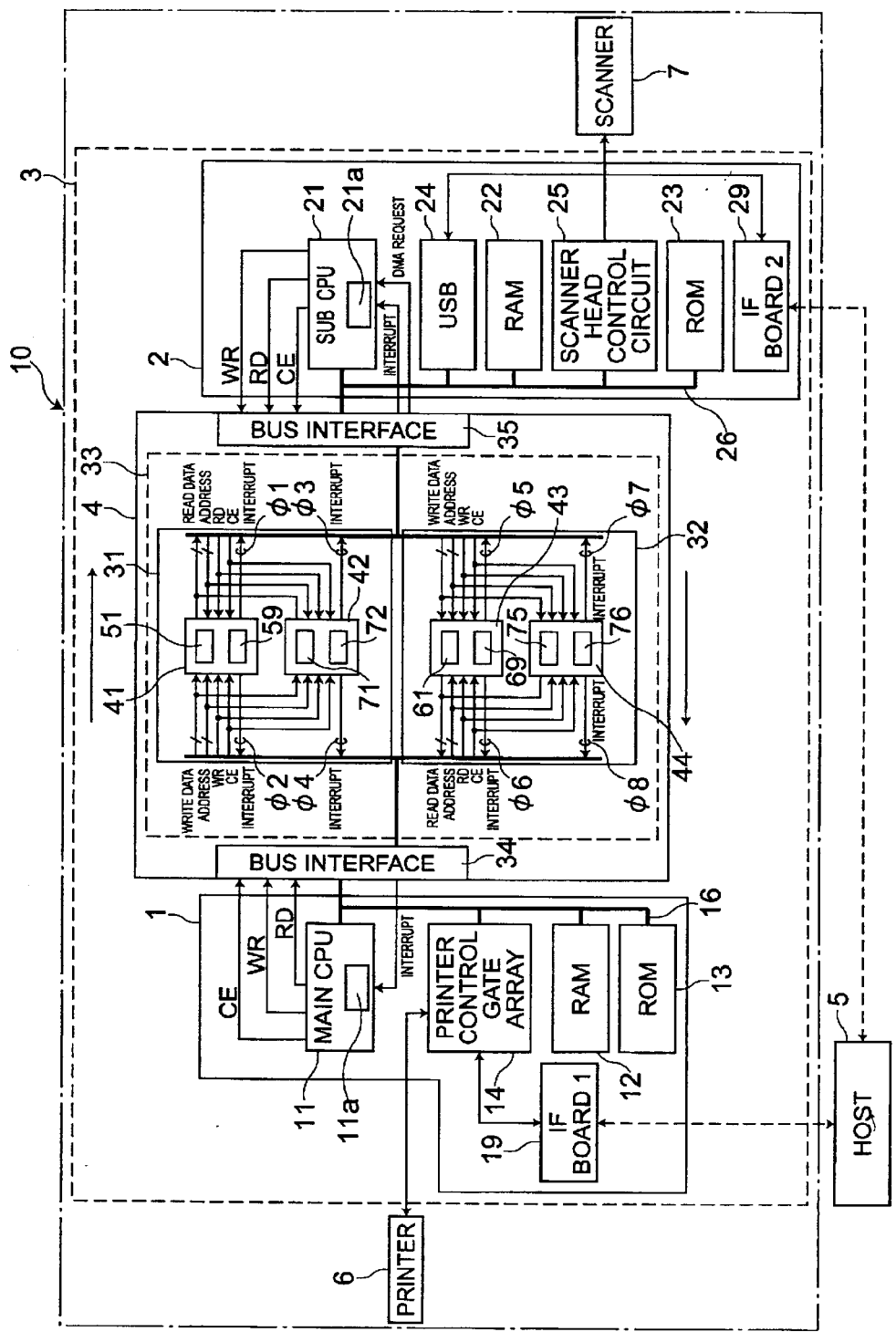
FIG. 2 shows the configuration of the communication unit in FIG. 1 in detail.

FIG. 2 shows a simplified representation of the multifunction device 10 of FIG. 1. All elements similar to those of FIG. 1 have similar reference numerals and are described above.

Figure 3:
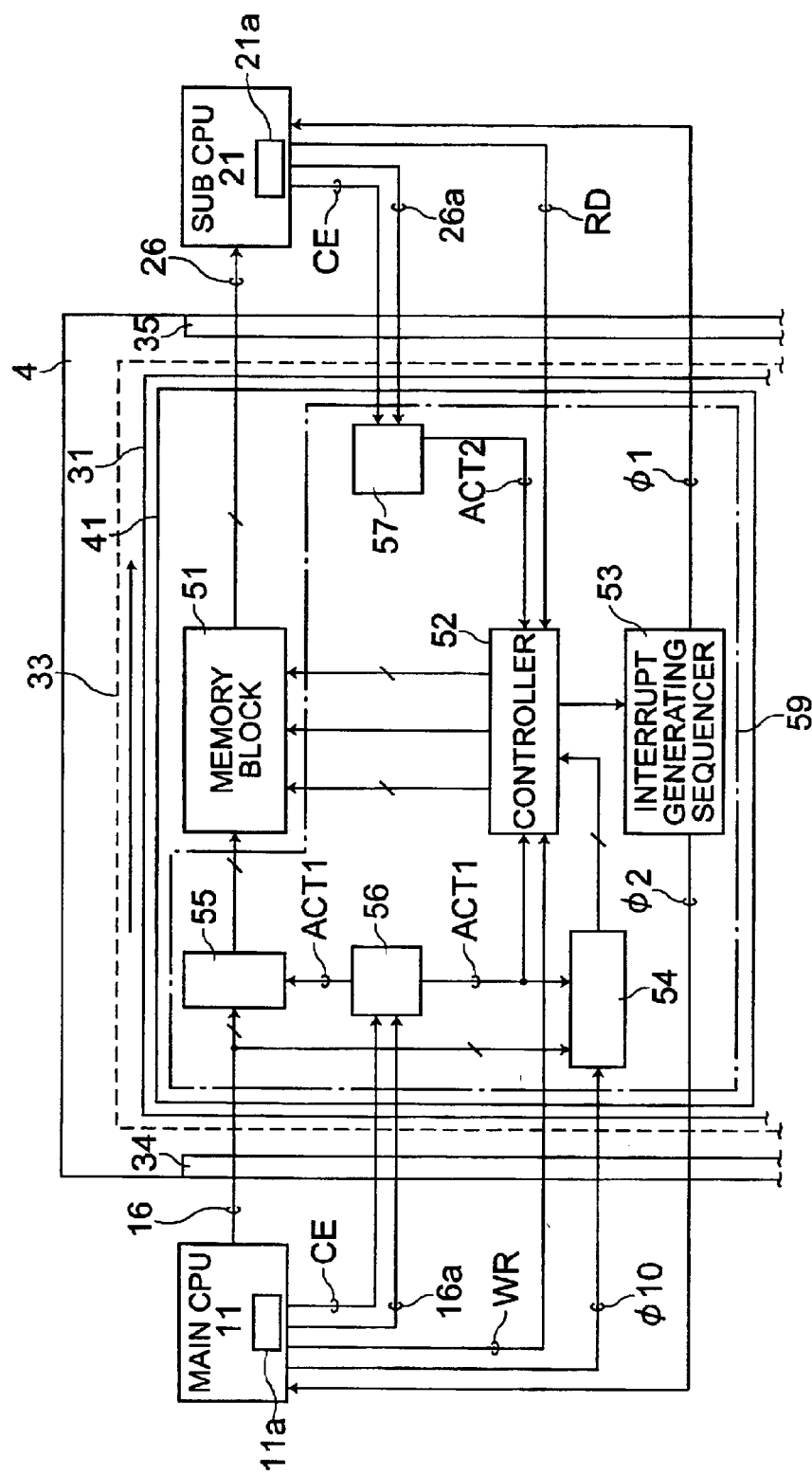
FIG. 3 shows the first buffer of the communication unit in detail.

FIG. 3 shows the configuration of the first buffer 41 in detail. This first buffer 41 has a memory block 51 including four 8-bit flip-flops, and management block 59 for managing the memory block 51. The management block 59 has a controller 52 with a function for specifying the read pointer and write pointer for accessing memory block 51 and counting the data stored in the memory block 51, and flip-flop 54 for setting various controller settings and parameters via bus 16 of the first data processing unit 1, shown in FIG. 2. The management block 59 also has an interrupt generating sequencer 53, flip-flop 55, write-side address decoder 56, and read-side address decoder 57. The interrupt generating sequencer 53 outputs write-enable interrupt signal $\phi 2$ to the main CPU 11, and read-enable interrupt signal $\phi 1$ to sub CPU 21 as controlled by the controller 52. The flip-flop 55 temporarily stores the data to be written to memory block 51 from main CPU 11. The write-side address decoder 56 decodes the address placed on address bus 16a, which constitutes part of bus 16, in accordance with the chip select signal CE from the main CPU 11, and outputs first active signal ACT1. The read-side address decoder 57 decodes the address placed on address bus 26a, which constitutes part of bus 26, in accordance with the chip select signal CE from the sub CPU 21, and outputs second active signal ACT2.

Figure 4:
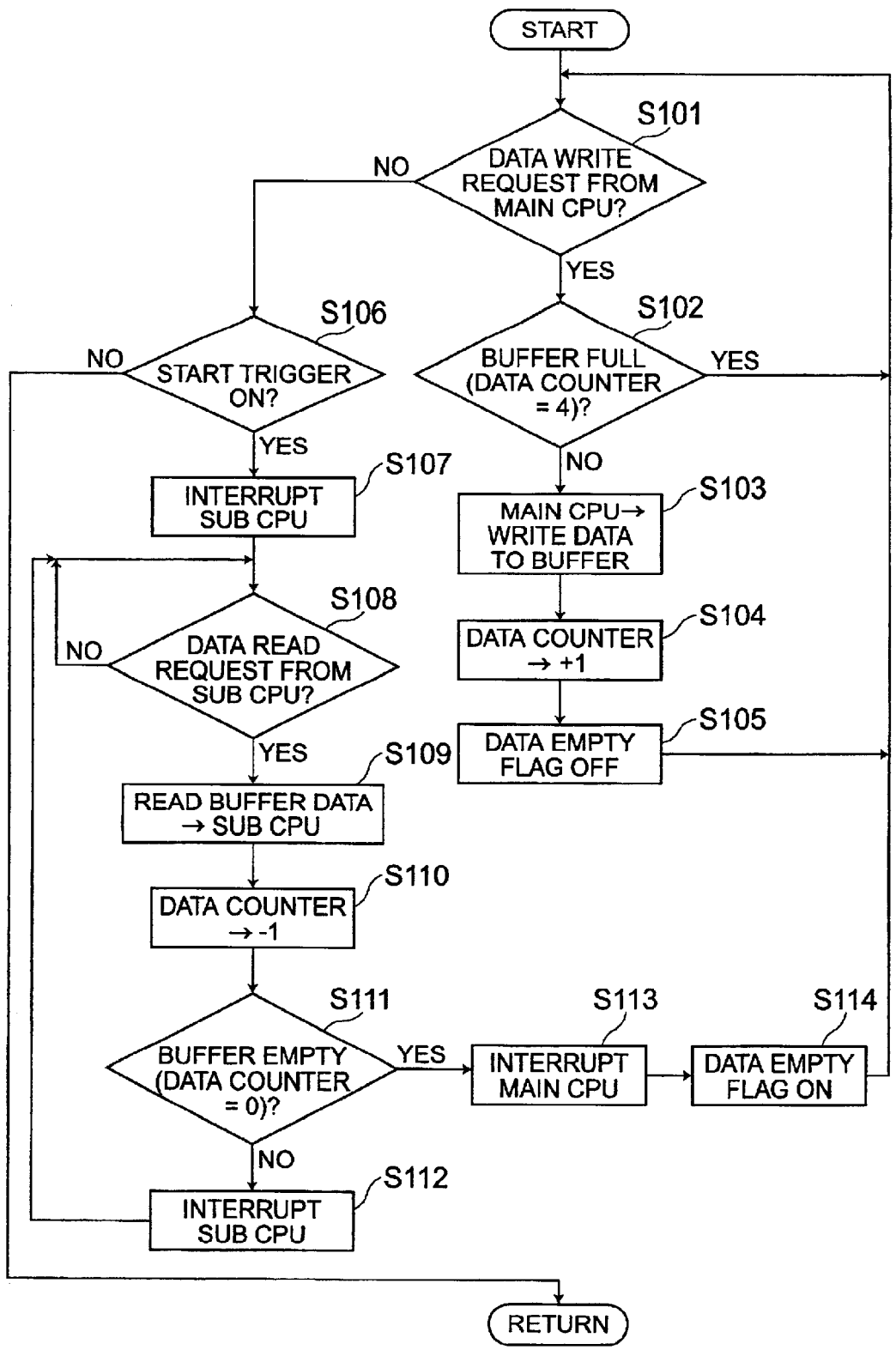
FIG. 4 is a flow chart of the process for transferring data using the first buffer.
Figure 5:
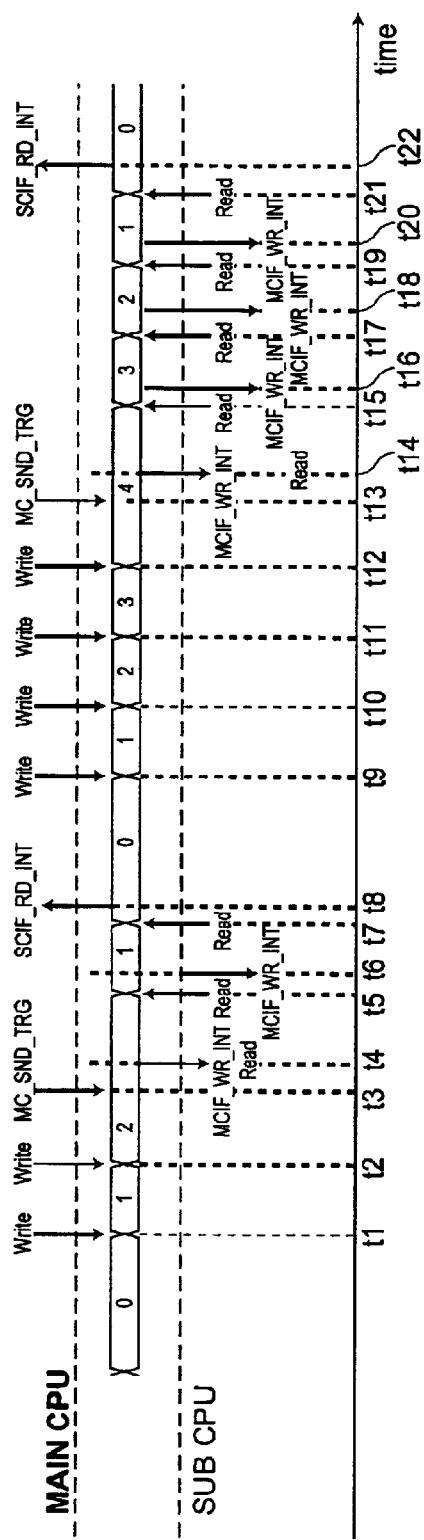
FIG. 5 is a timing chart showing the timing for reading and writing data to the first buffer.

The controller 52 of management block 59 controls reading and writing of memory block 51 according to the state of flip-flop 54. FIG. 4 is a flow chart of this control operation, and FIG. 5 is a timing chart of the same.

Referring to FIG. 4, a data counter of controller 52, not shown, maintains a count of the number of memory locations currently occupied within memory block 51. If it is set to zero, then no data is stored in the memory block 51. If an active signal ACT1 from write-side address decoder 56 is input to the controller 52, that is, if a write request signal from the main CPU 11 is confirmed (S101), controller 52 then determines whether the buffer, i.e. memory block 51, is full (that is, it determines whether the data counter is set to 4) (S102). If the buffer is not full (S102 returns no), one byte of data is written to the memory block 51 (at time t1 or t9) (S103). The data counter is then incremented (S104) and an empty flag identifying the state of memory block 51 is cleared (S105). Writing to memory block 51 (at time t10, t11, t12) continues in one byte blocks for as long as the main CPU 11 continues to send write requests until the data counter becomes full (i.e. is set to 4).

When the data counter becomes full, the main CPU 11 is no longer permitted to write to memory block 51. At time t13, therefore, the main CPU 11 outputs a start trigger signal (MC_SND_TRG) φ10. If start trigger signal φ10 is detected at step S106, a read-enable interrupt signal (MCIF_WR_INT) φ1 is output to the sub CPU 21 (at time t14) (S107). If a data read request from the sub CPU 21 is detected, that is, if read-side address decoder 57 outputs active signal ACT2 (S108) after interrupt signal φ1 is output, the sub CPU 21 is permitted to read from the buffer (i.e. from memory block 51 at time t15) (S109). If data is also read in one byte blocks, the data counter is decremented by the same amount as it was previously incremented (S110), and controller 52 determines whether the buffer is empty (S111), i.e. whether the data counter is set to zero. If the buffer is not empty, read-enable interrupt signal (MCIF_WR_INT) φ1 is again output (t16, t18, t20) to the sub CPU 21 (S112) so that the sub CPU 21 can continue reading data (t7, t19, t21) until the buffer is empty.

When the data counter goes to zero (S111), a write enable interrupt signal (SCIF_RD_INT) φ2 is output to the main CPU 11 (time t22) (S113), and the buffer empty flag is set (S114). The main CPU 11 is thus again able to write data to memory block 51.

If a write request is asserted when the data counter indicates that the buffer (memory block 51) is not full (at time t1 or t2, for example) and the start trigger signal (MC_SND_TRG) φ10 from main CPU 11 is detected (time t3), operation proceeds from step S107, as above. That is, a read-enable interrupt signal φ1 is output to the sub CPU 21 (time t4) and the sub CPU 21 reads data. When reading ends and the data counter has gone to zero, the write-enable interrupt signal φ2 is again output to the main CPU 11 (time t8), and the main CPU 11 is thus again enabled to write.

Figure 6:
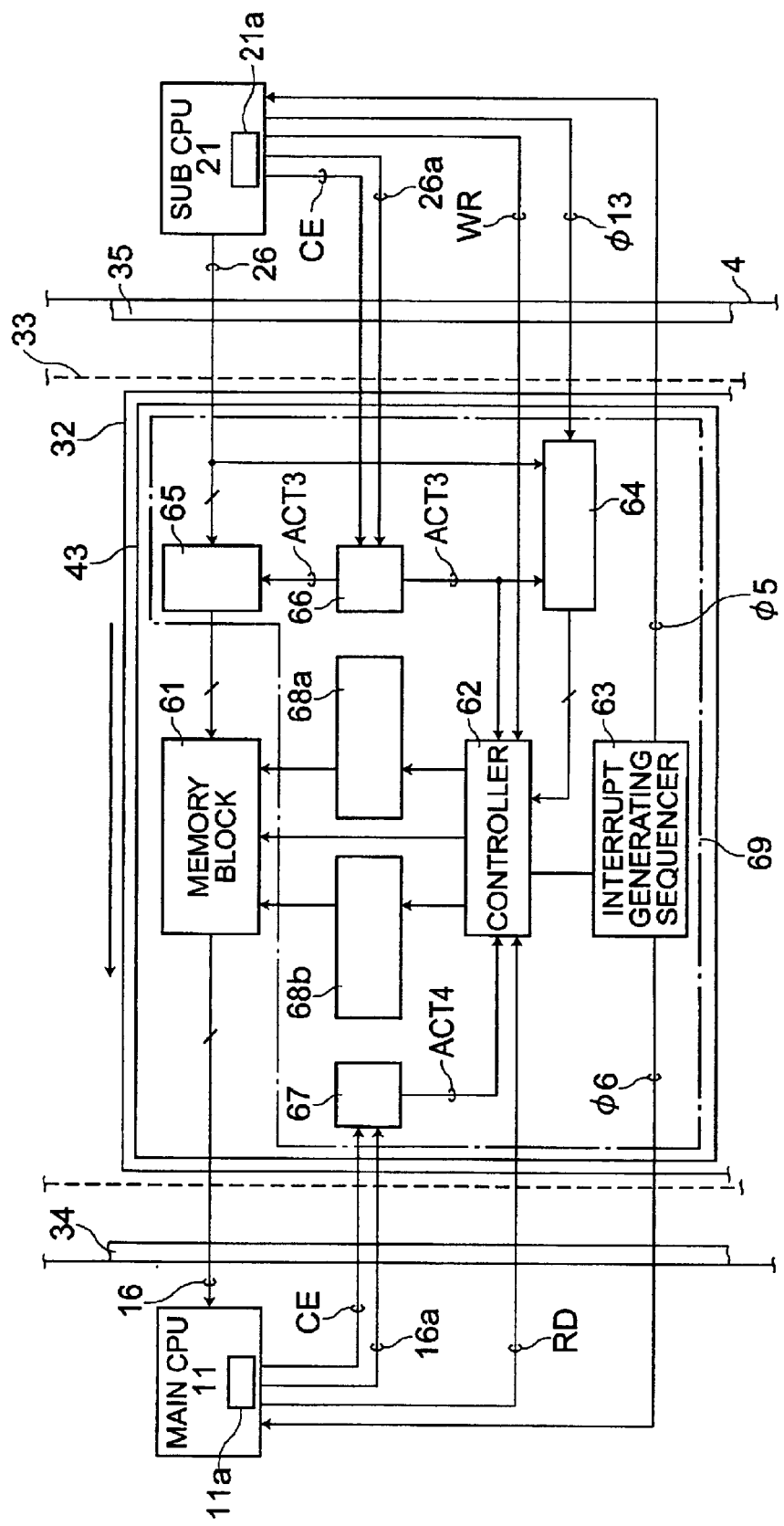
FIG. 6 shows the third buffer of the communication unit in detail.

FIG. 6 shows the configuration of third buffer 43 in detail. This third buffer 43 has a memory block 61 including an 8-byte flip-flop, and management block 69 for managing the memory block 61. The management block 69 has a controller 62 for specifying the read pointer and write pointer for accessing memory block 61 and counting the data stored in the memory block 61, and also has flip-flop 64 for setting various controller settings and parameters via internal bus 26 of the second data processing unit 2. The management block 69 also has an interrupt generating sequencer 63, flip-flop 65, write-side address decoder 66, and read-side address decoder 67. The interrupt generating sequencer 63 outputs read-enable interrupt signal φ6 to the main CPU 11, and write-enable interrupt signal φ5 to sub CPU 21 as controlled by the controller 62. The flip-flop 65 temporarily stores the data to be written to memory block 61 from main CPU 11.

The write-side address decoder 66 decodes the address placed on address bus 26a, which is part of bus 26, in accordance with the chip select signal CE from the sub CPU 21, and outputs active signal ACT3. The read-side address decoder 67 decodes the address output placed bus 16a, which is part of bus 16, in accordance with the chip select signal CE from the main CPU 11 and outputs active signal ACT4.

Although main CPU 11 can write to the first buffer 41 only when the data counter is set to zero, sub CPU 21 can write to the third buffer 43 even when the data counter is not set to zero. The third buffer 43 therefore has a write pointer counter 68a and a read pointer counter 68b. The controller 62 controls counters 68a and 68b so that data written to the memory block 61 is read in the order written and the buffer thus functions as FIFO (first in, first out) memory.

Figure 7:
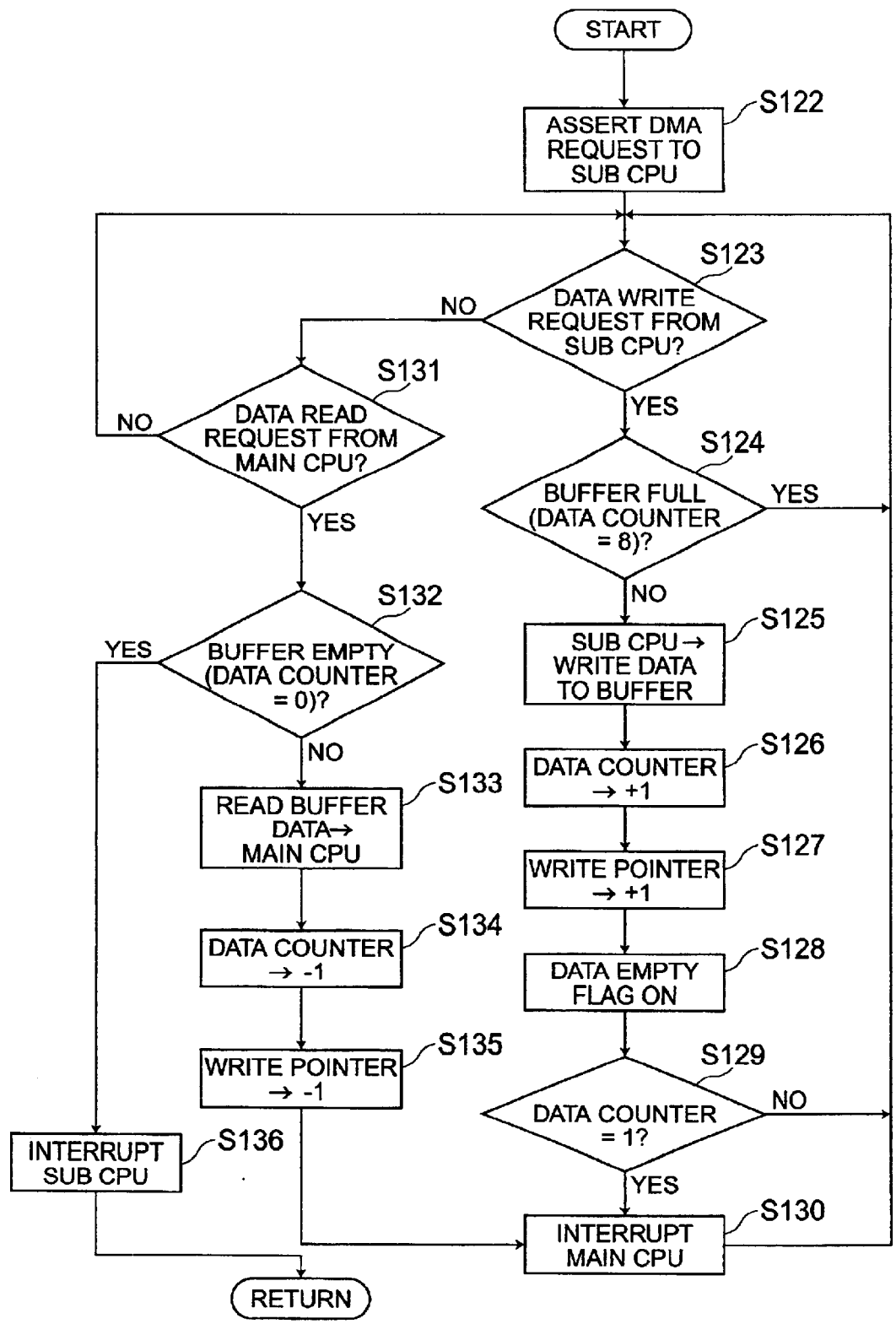
FIG. 7 is a flow chart of the process for transferring data using the third buffer.
Figure 8:
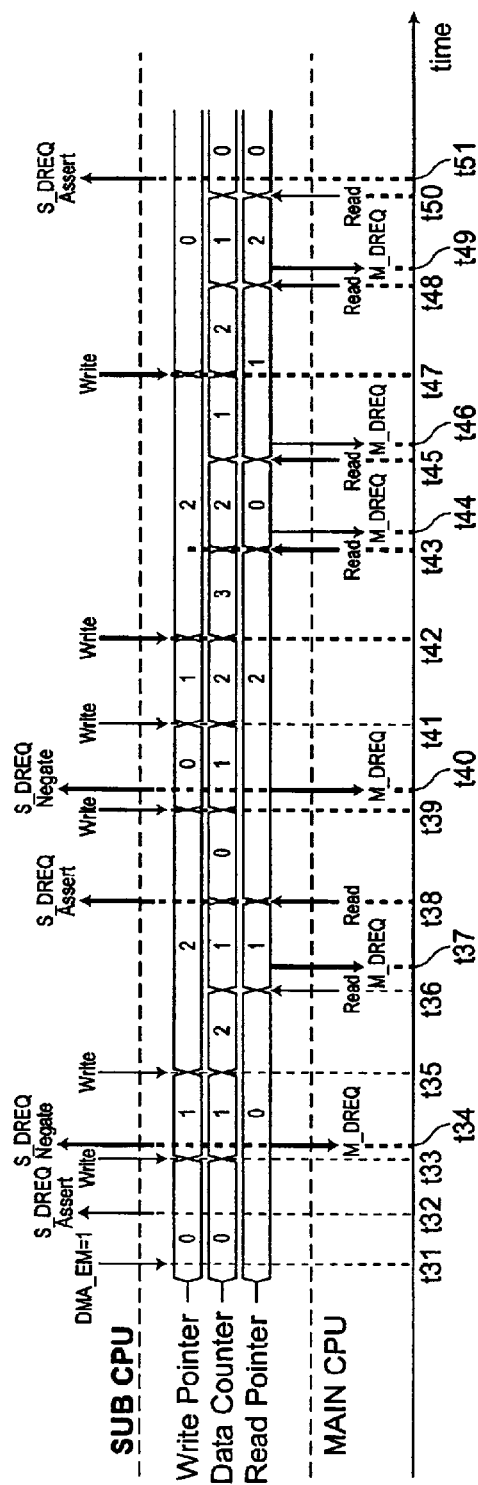
FIG. 8 is a timing chart showing the timing for reading and writing data to the third buffer.

FIG. 7 is a flow chart of management block 69 operation, and FIG. 8 is a timing chart of the same. In the example described below data received from the host 5 through interface 29 of second data processing unit 2 is supplied through the third buffer 43 to the first data processing unit 1. Both CPUs 11 and 21 in this data processing apparatus 3 function as DMA controllers 11a, 21a, enabling data to be sent by DMA transfer. A DMAC could obviously be disposed to buses 16 and 26 in addition to these CPUs. The process starts when the management block 69 detects (time t31) a DMA request enable signal (DMA_EN) φ13 from sub CPU 21 (S122). A write-enable interrupt signal φ5 (S_DREQ) is asserted (time t32) to sub CPU 21. If the sub CPU 21 outputs chip select signal CE and a write address (i.e. a data write request from the sub CPU 21 is detected) (S123) and the data counter is not full at (S124), the data is written to memory block 61 (time t33) (S125). The write-enable interrupt signal φ5 is negated then. After the data is written, the data counter is incremented (S126), and the write pointer is incremented (S127). The empty flag is then cleared (S128), and a read-enable interrupt signal φ6 (M_DREQ) is output to the main CPU 11 at time t34 (S130). This interrupt signal φ6 is output when in step S129 the data counter is set to 1, that is, one byte of data is written to the memory block 61.

If a data write request from the sub CPU 21 is not detected at step S123, and the main CPU 11 outputs chip select signal CE and a read address in response to interrupt signal φ6 (i.e. a data read request from main CPU 11 is detected in step S131) data is read from memory block 61. Even if a read request is received from the main CPU 11 while the sub CPU 21 is writing data, the main CPU 11 can read data (time t35). It is noted that a data write is not interrupted while the data counter is not full even though the write-enable interrupt signal φ5 is negated.

If a read request from main CPU 11 is detected in step S131 and step S132 confirms that the memory block 61 is not empty, the controller 62 and read pointer counter 68b specify the read pointer for memory block 61, and data is then read using the DMA function of the main CPU 11 in step S133 (time t36). When data is read out, the data counter is decremented in step S134, and the read pointer is reset to the next read address in step S135. Note that in this example data is read in one-byte units and interrupt signal φ6 (M_DREQ) is output (i.e. asserted) to the main CPU 11 when each data read operation ends. Therefore, if data is read at time t36, the interrupt signal φ6 is output to the main CPU 11 again at time t37 and data is read at time t38.

When reading is completed the data counter will be set to zero at step S132. The write-enable interrupt signal φ5

(S_DREQ) is therefore output to sub CPU 21 at step S136, namely this interrupt signal φ5 is re-asserted at t38. After that, one byte of data is written to the memory block 61 at times t39, t41, t42, and t47, and the data counter and write pointer are reset each time data is written. When the first data write is completed at time t39, the write-enable interrupt signal φ5 is negated at time t40 and read-enable interrupt signal φ6 is output to the main CPU 11. Interrupt request φ6 enables data reading at time t43 and continues to be output (at time t44, t46, t49) and data continues to be read (at time t45, t48, t50) until the data counter goes to zero. When the data counter goes to zero, the write-enable interrupt signal φ5 is again asserted to sub CPU 21 (time t51), and the above process repeats to transfer all data to the main CPU 11.

The second buffer 42 and fourth buffer 44 for command data include a 1-byte (8 bit) memory block 71, 75 and a management block 72, 76, respectively, for managing the memory blocks (see FIG. 2). The management blocks 72 and 76 each have a controller and interrupt generating sequencer as described above. The management block 72 of second buffer 42 therefore outputs write-enable interrupt signal φ4 to main CPU 11 and read-enable interrupt signal φ3 to sub CPU 21, and the management block 76 of fourth buffer 44 outputs write-enable interrupt signal φ7 to sub CPU 21 and read-enable interrupt signal φ8 to main CPU 11.

Data is exchanged between the first data processing unit 1 and second data processing unit 2 in the data processing apparatus 3 of this embodiment using the multiple buffers 41 to 44 of the communication unit 4. Furthermore, by dedicating first buffer 41 and second buffer 42 to data transfers from the main CPU 11 to the sub CPU 21, and third buffer 43 and fourth buffer 44 to data transfers from sub CPU 21 to the main CPU 11, these buffers 41 to 44 enable the CPUs to simultaneously input and output data even when requests to input and output data between the CPUs 11 and 21 are in contention. In addition, one CPU can output data to the other CPU without reading data sent from the other CPU, and data transfers can be controlled much more freely and easily.

The main CPU 11 and sub CPU 21 can therefore exchange data by simply notifying the write-side CPU or the read-side CPU that data is written to and can therefore be read from the buffers or has been read and can therefore be written. In the above, for example, management block 59 of first buffer 41 supplies a read-enable interrupt signal φ1 to the sub CPU 21 and a write enable interrupt signal φ2 to the main CPU 11, and data is thus sent through memory block 51 from main CPU 11 to sub CPU 21. It is also not necessary for each CPU 11, 21 to know the processing state of the other CPU, and data can thus be exchanged between the CPUs 11, 21 using the very simple process of writing when writing is enabled and reading when reading is enabled.

Data is likewise asynchronously transferred from sub CPU 21 through memory block 61 to main CPU 11 as a result of management block 69 in third buffer 43 outputting a write-enable interrupt signal φ5 to the sub CPU 21 and a read-enable interrupt signal φ6 to the main CPU 11. Command data can also be transferred from main CPU 11 to sub CPU 21 through memory block 71 as a result of management block 72 in second buffer 42 outputting read-enable interrupt signal φ3 to the sub CPU 21 and write-enable interrupt signal φ4 to the main CPU 11. Command data can also be asynchronously transferred from sub CPU 21 to main CPU 11 through memory block 75 as a result of management block 76 in fourth buffer 44 outputting write-enable interrupt signal φ7 to the sub CPU 21 and read-enable interrupt signal φ8 to the main CPU 11.

It will also be noted that the buffer 41 for transferring parallel data, such as printer status data, is discrete from the buffer 42 for sending command data from main CPU 11 to the sub CPU 21, and the buffer 43 for sending bulk data such as print data and image data is discrete from the buffer 44 for sending command data from sub CPU 21 to main CPU 11. By detecting which buffer is read, that is, by decoding the interrupt signal enabling reading, the destination (receiving) CPU can know whether the transferred data needs to be decoded by the CPU or whether it is bulk data that does not need decoding. By changing the buffer address according to whether command data or bulk data is being sent, the sending CPU can also tell the receiving CPU what type of data is being sent. The destination (receiving) CPU can therefore be notified of the type of data sent by simply changing the buffer to which the data is written. Data transfers using the respective buffers can also be independently controlled by the CPUs using the read-enable interrupt signals and write request interrupt signals.

The data processing apparatus 3 of the present embodiment thus also has a function enabling the receiving CPU to determine the data type without decoding the data even though both bulk data and command data can be asynchronously transferred between the first data processing unit 1 and second data processing unit 2 using buffers 41 to 44. Each CPU can therefore determine the type of transferred data without receiving such information from the sending CPU and without the receiving CPU interpreting all of the transferred data. Therefore, even if the receiving CPU interprets data sent through the command data buffer, the receiving CPU can skip a process for interpreting data sent through the bulk data buffer, and the processing load on the CPU associated with data transfers can thus be reduced.

It is therefore possible for the CPUs 11 and 21 to exchange data with each other in a multifunction device 10 using the data processing apparatus 3 of the present embodiment by independently writing and reading data to the buffers 41 to 44 of communication unit 4 without coordinating the processing operations of CPUs 11 and 21. Programming the CPUs 11 and 21, that is, programming the first data processing unit 1 controlling printer 6 and programming the second data processing unit 2 controlling scanner 7, is thus very simple. It is also possible to prevent a drop in data processing speed and to provide a high speed multifunction device 10 because the CPUs 11 and 21 can continue to separately input and output data without waiting for the other CPU when a process that requires an exchange of data runs.

FIG. 9 to FIG. 12 show an example in which the multifunction device operates as a POS printer 10 connected so that command data and bulk data can be exchanged between a host 5 and printer 6 and scanner 7 through external interface 29 of the second data processing unit 2. In this example bulk data and command data relating to the first data processing unit 1 are input/output through the communication unit 4.

Figure 9:
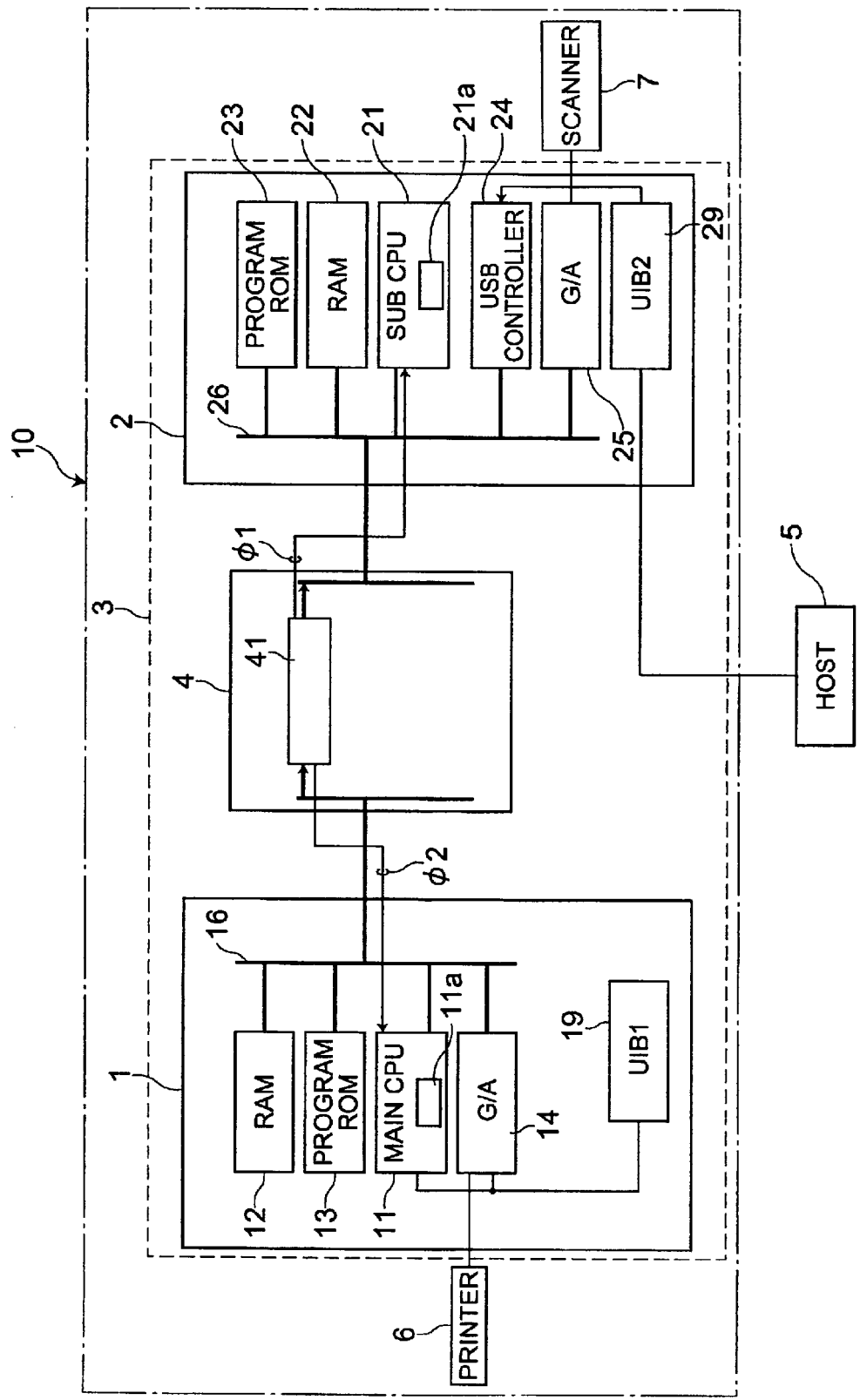
FIG. 9 is used to describe bulk data transfers from the first data processing unit to the second data processing unit using the first buffer in the data processing apparatus shown in FIG. 1.

Bulk data output from the first data processing unit 1 is first sent from the first data processing unit 1 to the second data processing unit 2 using first buffer 41 as shown in FIG. 9. The bulk data in this case includes automatic status back (ASB) data reporting the status of the printer 6, and as such is feedback data sent to the host 5 through the external interface 29 of the second data processing unit 2.

If the first data processing unit 1 controls a magnetic ink character reader (MICR) for reading information from checks, for example, the bulk data could also be the data read by the MICR.

If the write enable interrupt signal φ2 indicating the buffer is empty is received when data is sent from first data processing unit 1 to second data processing unit 2 through first buffer 41, data is written by the main CPU 11 of first data processing unit 1. When data is written to first buffer 41 by main CPU 11, a read-enable interrupt signal φ1 is supplied to the sub CPU 21 of second data processing unit 2, and the sub CPU 21 thus reads data from first buffer 41. The data is output from interface 29 to host 5 under the control of interface (USB) controller 24 after first buffering the data temporarily to RAM 22, or is output from interface 29 to host 5 as controlled by interface (USB) controller 24 when reading first buffer 41 is enabled. Because the first buffer 41 is assigned to data that does not require decoding or interpreting by the sub CPU 21, the sub CPU 21 can output the transferred data from interface 29 without first interpreting it when the first buffer 41 is read-enabled by the read-enable interrupt signal φ1.

Figure 10:
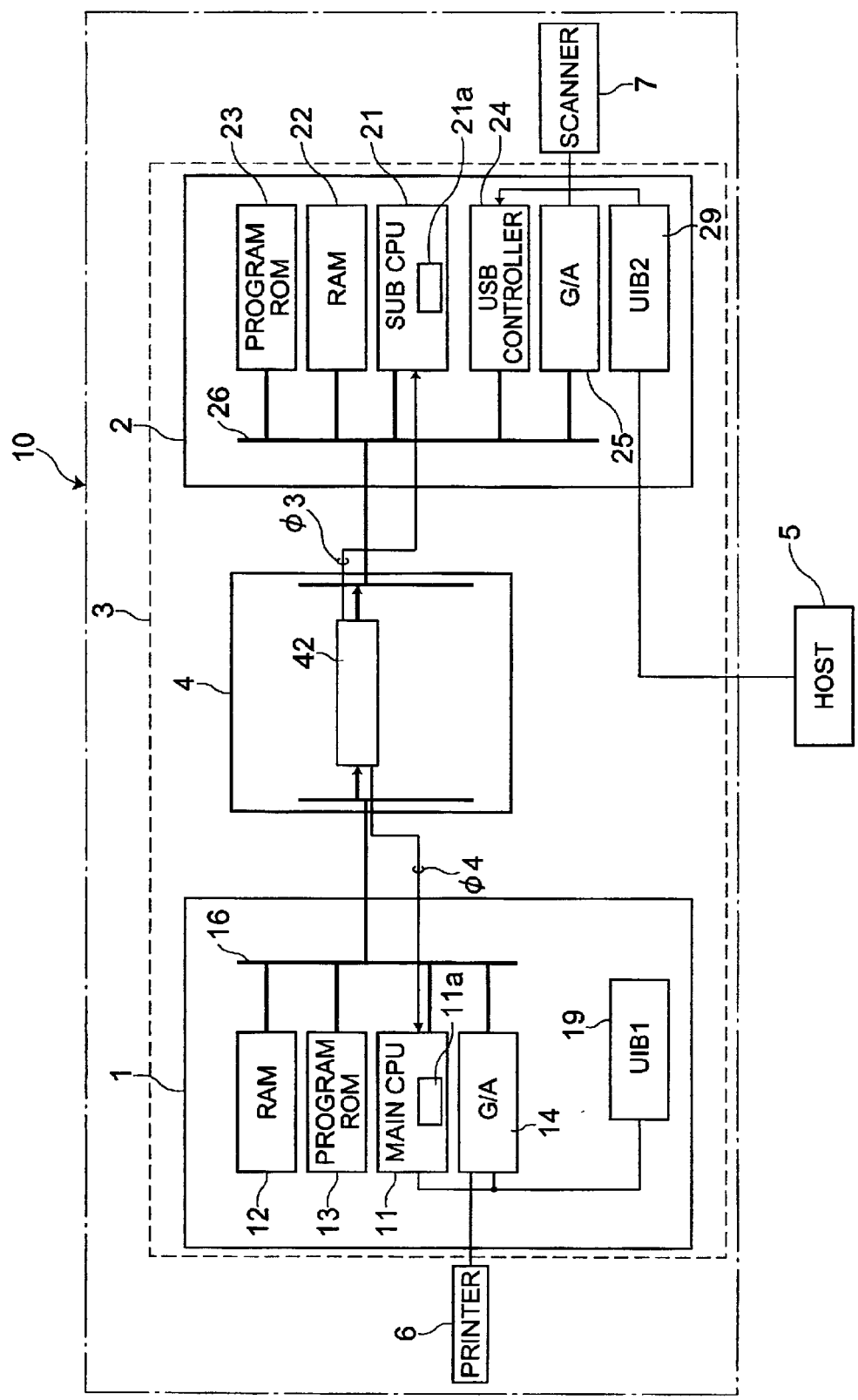
FIG. 10 is used to describe sending command data from the first data processing unit to the second data processing unit using the second buffer in the data processing apparatus shown in FIG. 1.

As shown in FIG. 10, command data from first data processing unit 1 to second data processing unit 2 is transferred through second buffer 42. When it is necessary to link control of scanner 7 to the printer 6, this command data includes command data from the main CPU 11 to the sub CPU 21. If all operating command data for the multifunction device 10 is interpreted by the main CPU 11, command data received through interface 29 from host 5 is first transferred to the first data processing unit 1 and then returned to the second data processing unit 2. When the second buffer 42 is used for transferring command data, the main CPU 11 writes command data to the second buffer 42 when write-enable interrupt signal φ4 is detected, and sub CPU 21 reads the command data when read-enable interrupt signal φ3 is detected. In this example the read-enable interrupt signal φ3 indicates that data was input to the second buffer 42 through which command data is transferred. Sub CPU 21 therefore decodes the data read from second buffer 42 and the second data processing unit 2 runs the corresponding process.

Figure 11:
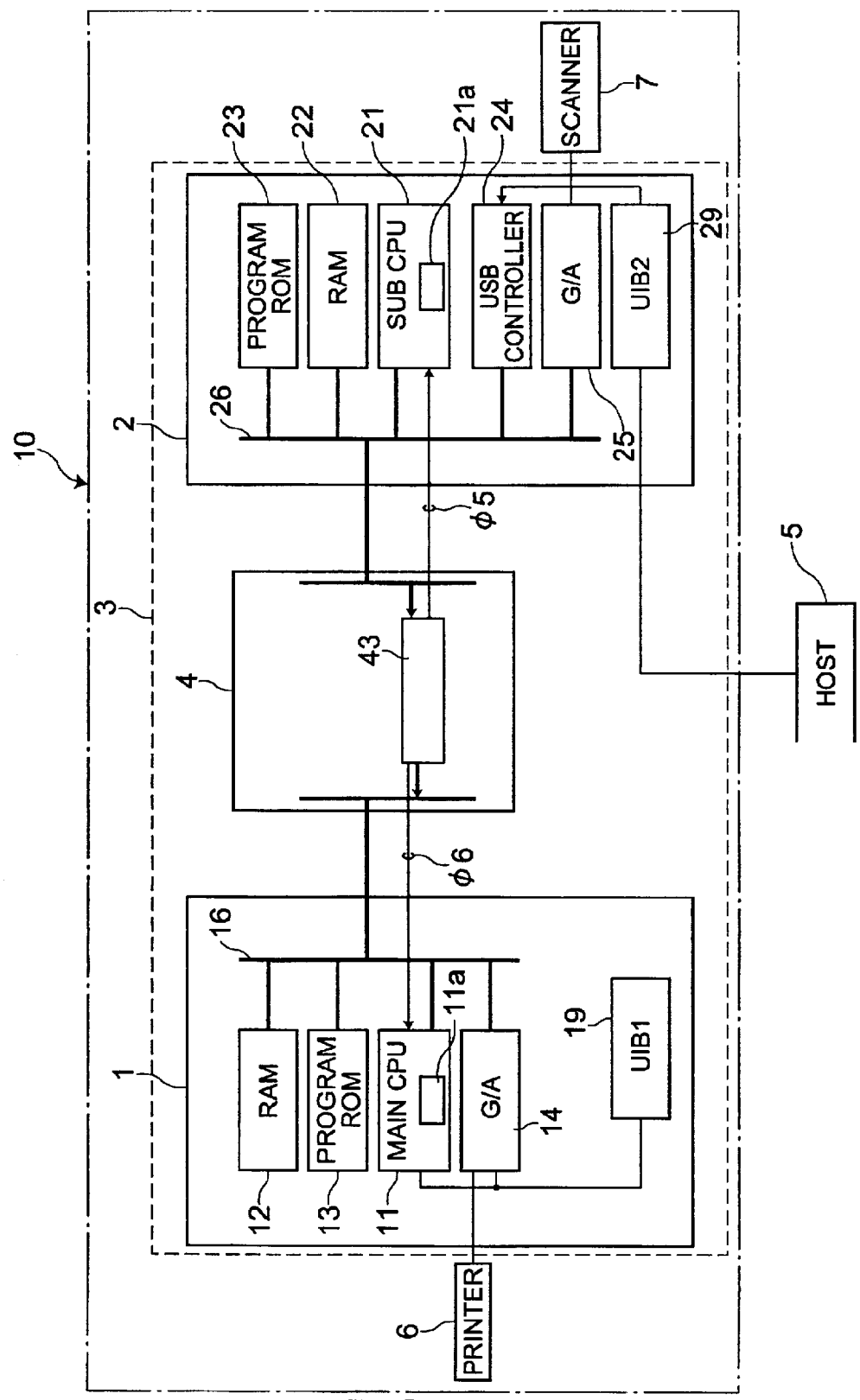
FIG. 11 is used to describe bulk data transfers from the second data processing unit to the first data processing unit using the third buffer in the data processing apparatus shown in FIG. 1.

As shown in FIG. 11, bulk data, for input to the first data processing unit 1, is sent from the second data processing unit 2 to first data processing unit 1 using the third buffer 43. This bulk data includes, for example, print data sent from the host 5, and is input in this embodiment in 8-byte units to the first data processing unit 1 through communication unit 4.

When data is transferred using third buffer 43, writing by sub CPU 21 to third buffer 43 and reading by main CPU 11 from third buffer 43 are asynchronously controlled by the write-enable interrupt signal φ5 output to the second data processing unit 2 and the read-enable interrupt signal φ6 output to the first data processing unit 1. Because the third buffer 43 is allocated to bulk data transfers, the CPUs 11 and 21 do not need to interpret the content of the transferred data, DMA transfers are possible as described above, and the sub CPU 21 and main CPU 11 in this embodiment function as DMA controllers. The sub CPU 21 therefore functions as a DMAC to send print data from interface 29 to the third buffer 43 by DMA transfer, and the main CPU 11 likewise functions as a DMAC to send print data from the third buffer 43 to RAM 12 by DMA transfer. Interrupt signals φ5 and φ6 are used as the DMA request signals in this case.

Figure 12:
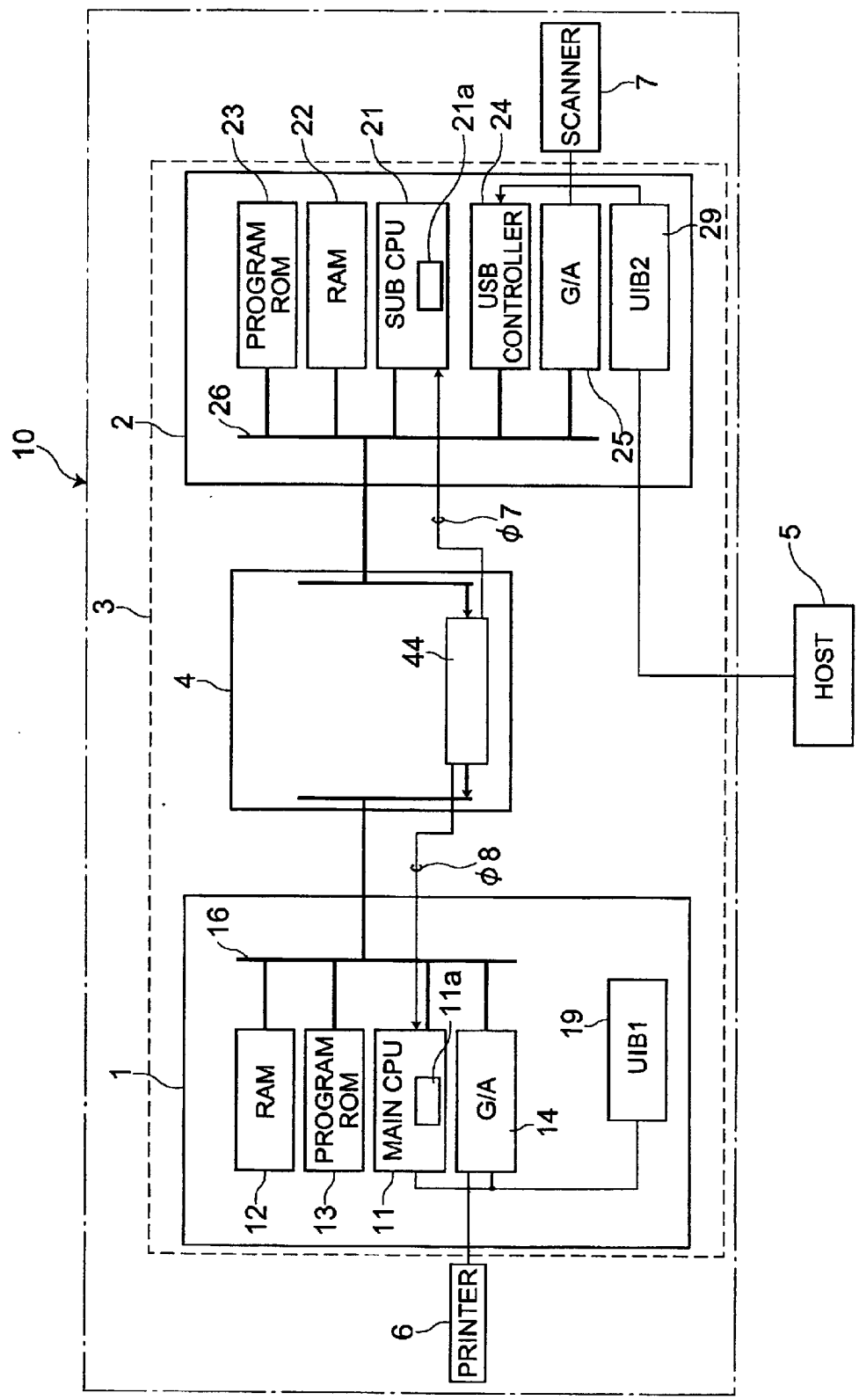
FIG. 12 is used to describe command data transfers from the second data processing unit to the first data processing unit using the fourth buffer in the data processing apparatus shown in FIG. 1.

As shown in FIG. 12, command data is sent from second data processing unit 2 through the fourth buffer 44 to the first data processing unit 1. This command data includes command data whereby the host 5 controls the printer 6. When command data is transferred using the fourth buffer 44, sub CPU 21 writes command data to the fourth buffer 44 when write-enable interrupt signal φ7 is received, and main CPU 11 reads the command data when read-enable interrupt signal φ8 is received, as described above. The printer 6 is controlled according to this command data. A MICR and other components of the multifunction device 10 controlled by the first data processing unit 1 are similarly controlled by receiving and interpreting command data directed to those specific components.

This type of multifunction device 10 is suitable for developing a system around the first data processing unit 1 providing multiple functions based on the printer 6. By adding a scanner 7 and second data processing unit 2 controlling the scanner 7, the present embodiment provides both a printer 6 and scanner 7 in a multifunction device 10 that can be controlled by the host 5 as a single peripheral device. This type of multifunction device 10 can be developed by developing a single data processing unit controlling all functions of the multifunction device 10, that is, the printer 6 and scanner 7, and is preferable in terms of processing efficiency. The development time and development cost, however, increase. Yet further, proven control units 1 developed for the printer 6 cannot be used, and if a second data processing unit 2 was developed for the scanner 7 it also cannot be used.

With the multifunction device 10 of the present invention, however, proven control units 1 and 2 can be combined with a communication unit 4 to provide a system functioning as both printer and scanner. This makes it possible to significantly reduce development time and cost, and makes it possible to provide a high reliability multifunctional device because proven printer and scanner control units can be used.

If different types of communication interfaces are used in the control units 1 and 2 as the communication interface to the 5, the printer 6 and scanner 7 can be controlled using the most suitable communication interface. For example, the first data processing unit 1 developed for a printer typically has a parallel interface such as a Centronics interface. The second data processing unit 2 developed for a scanner, however, preferably has a USB interface, IEEE-1394 interface, SCSI interface, RS-232C interface, or other type of high speed serial interface. It is therefore possible to select the interface best suited to the application.

With the multifunction device 10 of the present embodiment data is exchanged between data processing units 1 and 2 as a result of the CPUs 11 and 21 in the data processing units 1 and 2 separating writing and reading data to the buffers 41 to 44. It is therefore extremely simple to program the data processing units 1 and 2 to function as a multifunction device 10. Furthermore, because CPUs 11 and 21 can independently input and output data, a drop in data processing speed can be prevented when used together.

Separating the command data buffers from the bulk data buffers also enables the CPUs to handle data that does not require interpreting without interpreting the data. It is therefore not necessary to interpret all read data and, as a result, prevent a drop in data communication efficiency between data processing units resulting from the bottleneck created by interpreting print data and other such bulk data. It is therefore possible to send print data from the host 5 captured by the second data processing unit 2 to the gate array 14 for printing by the printer 6 without the first data processing unit 1 first interpreting the print data, and a POS printer 10 can be provided as a multifunctional device with a shorter delay between when print data is received and when printing starts.

The preceding embodiment describes communication with the host 5 using an external interface 29 disposed in the second data processing unit 2, but it will be obvious that communication with the host 5 is also possible through the external interface 19 of the first data processing unit 1. In this case image data generated by the scanner 7 can be sent from the second data processing unit 2 through communication unit 4, and from the external interface 19 of the first data processing unit 1 to the host 5.

It is therefore preferable to send data from the second data processing unit 2 to the first data processing unit 1 using the third buffer 43 for bulk data transfers.

Figure 13:
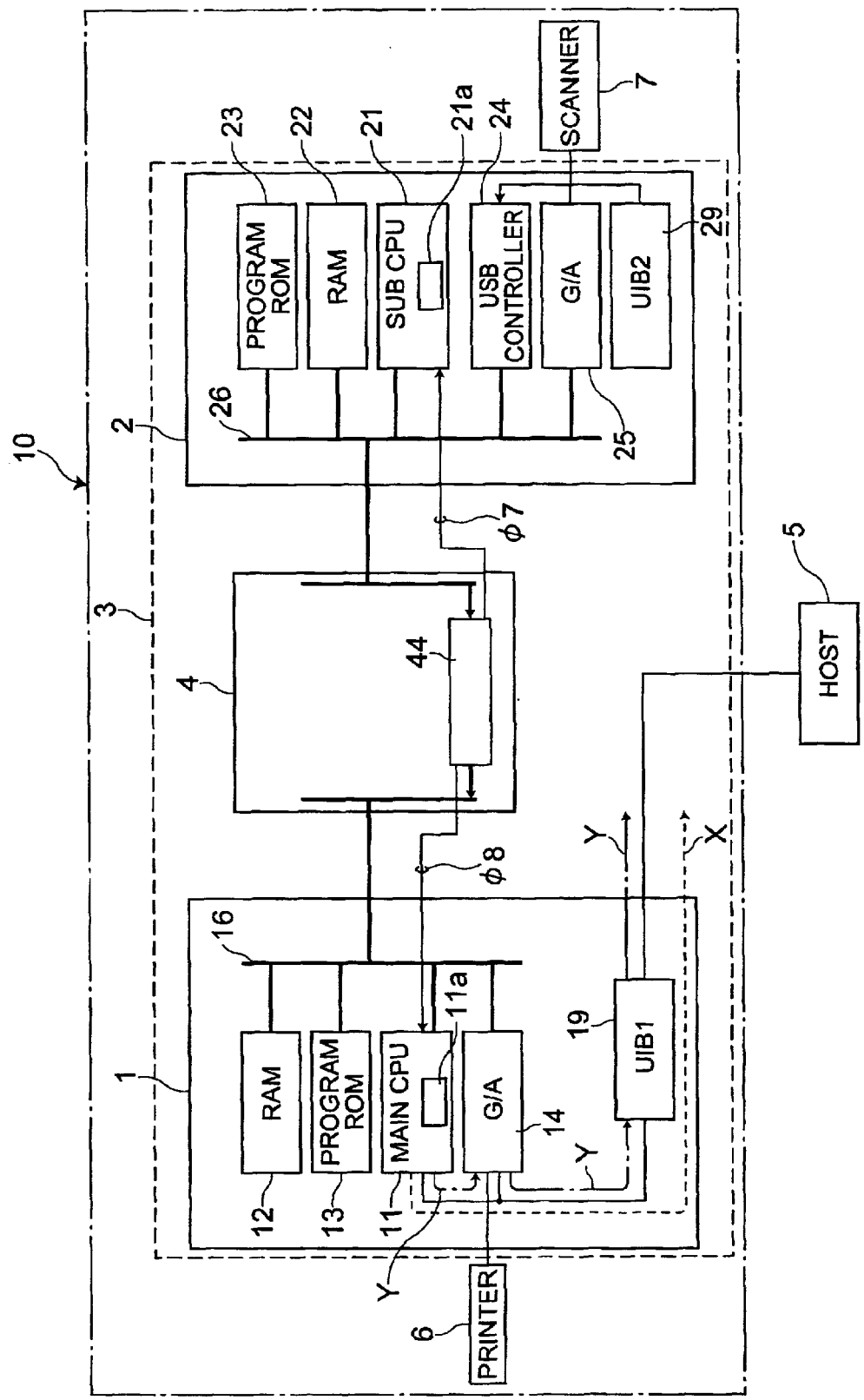
FIG. 13 is used to describe sending data from the second data processing unit side through the first data processing unit to the host by means of the fourth buffer in the data processing apparatus shown in FIG. 1.

It should be noted that because the first data processing unit 1 in the present embodiment is designed for printing print data received from the host 5 with the printer 6, the external interface 19 of the first data processing unit 1 can receive print data from the host 5 at high speed but is not intended for sending large amounts of data from the first data processing unit 1 to the host 5. Communication between the first data processing unit 1 and host 5 using the third buffer 43 could therefore become a bottleneck even if an 8-byte third buffer 43 is used. As shown in FIG. 13, the present embodiment therefore uses the 1-byte fourth buffer 44 of the communication unit 4 to send scanner data to the host 5 through external interface 19.

The fourth buffer 44 is used for command data, and scanner data read from the fourth buffer 44 is decoded by the main CPU 11. Therefore, as a preprocess for sending scanner data from the second data processing unit 2 to the first data processing unit 1, command data for starting the scanner data transfer process is sent from second data processing unit 2 to the first data processing unit 1. After the first data processing unit 1 interprets this command data, it handles the fourth buffer 44 for bulk data transmissions.

The first data processing unit 1 of the present embodiment can additionally select an asynchronous serial communication interface (such as RS-232C) or, for example, parallel communication interface for the external interface 19. When an asynchronous serial transfer mode is selected, data is transferred from the external interface 19 to the host 5 using the universal asynchronous receiver transmitter (UART) function built in to the main CPU 11 as indicated by the dotted line X in FIG. 13. For transfers other than by asynchronous serial transfer mode, the main CPU 11 writes the data to send to the host 5 to the gate array 14, and a control device built in to the gate array 14 according to the particular communication method sends the data from the external interface 19 to the host 5.

Considering a first data processing unit 1 thus comprised, the buffer configuration of the communication unit 4 for sending data to the second data processing unit 2 preferably has the same storage capacity as the send buffer and the receive buffer of the gate array 14. The first buffer 41 of the communication unit 4 therefore stores four bytes and the third buffer 43 stores eight bytes in the communication unit 4 of the multifunction device 10 according to this embodiment of the invention. By thus matching the buffer capacity of the external interface 19 and the buffer capacity of the communication unit 4 for sending data to the second data processing unit 2, the main CPU 11 can exchange data with the second data processing unit 2 by simply changing the buffer address of the send/receive destination, and a multifunction device 10 including a second data processing unit 2 can be easily designed.

It will therefore be obvious that the above-cited storage capacity of the buffers is for example only and shall not limit the scope of the present invention. Furthermore, bulk data is described as being sent by DMA transfer mode, but this is also for example only and the invention shall not be so limited. Yet further, a data I/O apparatus according to the present invention shall not be limited to a multifunction device suited to a POS printer, and can be applied to all data processing devices and systems needed to exchange data between multiple data processing units each having a CPU.

[Advantages of the Present Invention]

As described above, the present invention provides an architecture having a first storage means used for transferring data from a first data processing unit to a second data processing unit, and a second storage means used for transferring data from the second data processing unit to the first data processing unit. A data input/output method using the first storage means when sending data from the first data processing unit to the second data processing unit, and using the second storage means when sending data from the second data processing unit to the first data processing unit, can therefore be used so that the first CPU and the second CPU can input or output data simultaneously to each other even when the first CPU and the second CPU compete with each other to input and output data therebetween.

It is also possible to output data to the other CPU before that CPU has read the sent data, data transfers can thus proceed asynchronously, and data transfer freedom is significantly improved. It is therefore possible to exchange data between the CPUs by inputting or outputting data to the first and second storage means of the communication means without coordinating control of CPU processing operations. Programming both CPUs is thus easy, data can be input and output without waiting for CPU processes, and faster processing can thus be achieved.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data processing apparatus comprising:
   a first data processing unit having a first CPU;
   a second data processing unit having a second CPU; and
   a communication interface enabling data exchange between said first and second data processing units, said communication interface having:
      a first storage unit for holding data during its transfer from said first data processing unit to said second data processing unit, and
      a second storage unit for holding data during its transfer from said second data processing unit to said first data processing unit;
   wherein:
      said first storage unit includes a first buffer for transferring bulk data from said first data processing unit to said second data processing unit, and a second buffer for transferring command data from said first data processing unit to said second data processing unit; and
      said second storage unit includes a third buffer for transferring bulk data from said second data processing unit to said first data processing unit, and a fourth buffer for transferring command data from second data processing unit to said first data processing unit.

2. A data processing apparatus as described in claim 1, wherein said communication interface further includes:
   a first signal-output generator for sending a first data-available signal to said second CPU when data is written to said first storage unit, and sending a read-active signal to said first CPU when data is read from said first storage means; and
   a second signal-output generator for sending a second data-available signal to said first CPU when data is written to said second storage unit, and sending a second read-active signal to said second CPU when data is read from said second storage, means.

3. A data processing apparatus comprising:
   a first data processing unit having a first CPU;
   a second data processing unit having a second CPU; and
   a communication interface enabling data exchange between said first and second data processing units, said communication interface having:
   a first storage unit for holding data during its transfer from said first data processing unit to said second data processing unit, and
   a second storage unit for holding data during its transfer from said second data processing unit to said first data processing unit;
   wherein:
   said first storage unit includes a first buffer for transferring bulk data from said first data processing unit to said second data processing unit, and a second buffer for transferring command data from said first data processing unit to said second data processing unit; and
   said second star age unit includes a third buffer for transferring bulk data from said second data processing unit to said first data processing unit, and a fourth buffer for transferring command data from said second data processing unit to said first data processing unit; and
   wherein said communication interface includes:
   a first data-transfer-management unit for sending a first bulk-data-available signal to said second CPU when data is written to said first buffer, and sending a first bulk-read-active signal to said first CPU when data is read from said first buffer;
   a second data-transfer-management unit for sending a first command-data-available signal to said second CPU when data is written to said second buffer, and sending a first command-read-active signal to said first CPU when data is read from the second buffer;
   a third data-transfer-management unit for sending a second bulk-data-available signal to said first CPU when data is written to said third buffer, and sending a second bulk-read-active signal to said second CPU when data is read from said third buffer; and
   a fourth data-transfer-management unit for sending a second command-data-available signal to said first CPU when data is written to said fourth buffer, and sending a second command-read-active signal to said second CPU when data is read from said fourth buffer.

4. A data processing apparatus as described in claim 3, wherein said first data processing unit implements a DMA function for inputting bulk data to said first buffer and outputting bulk data from said third buffer.

5. A data processing apparatus as described in claim 3, wherein said second data processing unit implements a DMA function for inputting bulk data to said third buffer and outputting bulk data from said first buffer.

6. A data processing apparatus as described in claim 3, wherein said first data processing unit further includes an external interface, and is effective for implementing a DMA function for transferring bulk data from said external interface to said first buffer, and transferring bulk data from said third buffer to said external interface.

7. A data processing apparatus as described in claim 6, wherein said second data processing unit is effective for implementing a DMA function for inputting bulk data to said third buffer and outputting bulk data from said first buffer.

8. A data processing apparatus as described in claim 3, wherein said second data processing unit further includes an external interface, and is effective for implementing a DMA function for transferring bulk data from said external interface to said third buffer and transferring bulk data from said first buffer to said external interface.

9. A data processing apparatus as described in claim 8, wherein said first data processing unit is effective for implementing a DMA function for inputting bulk data to said first buffer and outputting bulk data from said third buffer.

10. A data input/output apparatus comprising:
    a first data input/output unit to input and/or output data;
    a second data input/output unit to input and/or output data;
    a first data processing unit having a first CPU for controlling said first data input/output unit;
    a second data processing unit having a second CPU for controlling said second data input/output unit; and
    a communication interface for data exchange between said first and second data processing units, said communication interface including:
    a first storage unit for holding data during its transfer from said first data processing unit to said second data processing unit, and
    a second storage unit for holding data during its transfer from the second data processing unit to the first data processing unit;
    wherein:
    said first storage unit includes a first buffer for transferring bulk data from said first data processing unit to said second data processing unit, and a second buffer for transferring command data from said first data processing unit to said second data processing unit; and
    said second storage unit includes a third buffer for transferring bulk data from said second data processing unit to said first data processing unit, and a fourth buffer for transferring command data from said second data processing unit to said first data processing unit.

11. A data input/output apparatus as described in claim 10, wherein said communication interface further includes:
    a first signal output unit for sending a first data-available signal to said second CPU when data is written to said first storage unit, and sending a first data-read signal to said first CPU when data is read from said first storage unit; and
    a second signal output unit for sending a second data-available signal to said first CPU when data is written to said second storage means, and sending a second data-read signal to said second CPU when data is read from the second storage means.

12. A data input/output apparatus comprising:
a first data input/output unit to input and/or output data;
a second data input/output unit to input and/or output data;
a first data processing unit having a first CPU for controlling said first data input/output unit;
a second data processing unit having a second CPU for controlling said second data input/output unit; and
a communication interface for data exchange between said first and second data processing units, said communication interface including:
a first storage unit for holding data during its transfer from said first data processing unit to said second data processing unit, and
a second storage unit for holding data during its transfer from the second data processing unit to the first data processing unit;
wherein:
said first storage unit includes a first buffer for transferring bulk data from said first data processing unit to said second data processing unit, and a second buffer for transferring command data from said first data processing unit to said second data processing unit; and
said second storage unit includes a third buffer for transferring bulk data from said second data processing unit to said first data processing unit, and a fourth buffer for transferring command data from said second data processing unit to said first data processing unit; and
wherein said communication interface further includes:
a first data-transfer-management unit for sending a first bulk-data-available signal to said second CPU when data is written to said first buffer, and sending a first bulk-read-active signal to said first CPU when data is read from said first buffer;
a second data-transfer-management unit for sending a first command-data-available signal to said second CPU when data is written to said second buffer, and sending a first command-read-active signal to said first CPU when data is read from said second buffer;
a third data-transfer-management unit for sending a second bulk-data-available signal to said first CPU when data is written to said third buffer, and sending a second bulk-read-active signal to said second CPU when data is read from the third buffer; and
a fourth data-active-management unit for sending a second command-data-available signal to said first CPU when data is written to said to said fourth buffer, and sending a second command-read-active signal to said second CPU when data is read from said fourth buffer.

13. A data input/output apparatus as described in claim 12, wherein said first data processing unit implements a DMA function for running a process to transfer bulk data from said first data input/output unit to said first buffer and/or a process to transfer bulk data from said third buffer to said first data input/output unit.

14. A data input/output apparatus as described in claim 12, wherein said second data processing unit implements a DMA function for running a process to transfer bulk data from said second data input/output unit to said third buffer and/or a process to transfer bulk data from said first buffer to said second data input/output unit.

15. A data input/output apparatus as described in claim 12, wherein said first data processing unit further includes an external interface, and is effective for implementing a DMA function for running a process to transfer bulk data from said external interface to said first buffer and/or a process transfer bulk data from said third buffer to said external interface.

16. A data input/output apparatus as described in claim 12, wherein said second data processing unit is effective for implementing a DMA function for running a process to transfer bulk data from said second data input/output unit to said third buffer and/or a process to transfer bulk data from said first buffer to said second data input/output means.

17. A data input/output apparatus as described in claim 12, wherein said second data processing unit further includes an external interface, and is effective for implementing a DMA function for running a process to transfer bulk data from said external interface to said third buffer and/or a process to transfer bulk data from said first buffer to said external interface.

18. A data input/output apparatus as described in claim 17, wherein said first data processing unit is effective for implanting a DMA function for running a process to transfer bulk data from said first data input/output unit to said first buffer and/or a process to transfer bulk data from said third buffer to said first data input/output unit.

19. A data input/output apparatus as described in claim 12, wherein said first data input/output unit is effective for printing to paper, and said second data input/output unit is effective for reading image data from paper.

20. A data input/output apparatus as described in claim 12, wherein said first data processing unit further includes:
an external interface;
a receive buffer for holding data received from an external device through said external interface; and
a send buffer for holding data to be sent to said external device;
wherein said first buffer and said send buffer have equal storage capacity, and wherein said third buffer and said receive buffer have equal storage capacity.

21. A data input/output apparatus as described in claim 12, wherein said second data processing unit further includes:
an external interface;
a receive buffer for holding data received from an external device through said external interface; and
a send buffer for holding data to be sent to said external device;
wherein said first buffer and said receive buffer have equal storage capacity, and wherein said third buffer and said send buffer equal storage capacity.

22. A data input/output method for exchanging data between a first data processing unit having a first CPU and a second data processing unit having a second CPU, said method comprising:
a first step for transferring data from said first data processing unit to said second data processing unit using a first storage unit; and
a second step for transferring data from said second data processing unit to said first data processing unit using a second storage unit different from said first storage unit;
wherein:
said first storage unit includes a first buffer and a second buffer, and wherein said second storage unit includes a third buffer and a fourth buffer, and wherein:
said first step transfers bulk data from said first data processing unit to said second data processing unit using said first buffer, and transfers command data from said first data processing unit to said second data processing unit using said second buffer; and said second step transfers bulk data from said second data processing unit to said first data processing unit using said third buffer, and transfers command data from said second data processing unit to said first data processing unit using said fourth buffer.

23. A data input/output method as described in claim 22, further comprising:
   a step for sending a first data-available signal to said second CPU when data is written to said first storage unit, and for sending a first read-active signal to said first CPU when data is read from said first storage means; and
   a step for sending a second data-available signal to said first CPU when data is written to said second storage unit, and for sending a second read-active signal to said second CPU when data is read from said second storage unit.

24. A data input/output method for exchanging data between a first data processing unit having a first CPU and a second data processing unit having a second CPU, said method comprising:
   a first step for transferring data from said first data processing unit to said second data processing unit using a first storage unit; and
   a second step for transferring data from said second data processing unit to said first data processing unit using a second storage unit different from said first storage unit;
   wherein:
      said first storage unit includes a first buffer and a second buffer, and wherein said second storage unit includes a third buffer and a fourth buffer, and wherein:
      said first step transfers bulk data from said first data processing unit to said second data processing unit using said first buffer, and transfers command data from said first data processing unit to said second data processing unit using said second buffer; and
      said second step transfers bulk data from said second data processing unit to said first data processing unit using said third buffer, and transfers command data from said second data processing unit to said first data processing unit using said fourth buffer; and
   said method further comprising:
      a step for sending a first bulk-data-available signal to said second CPU when data is written to said first buffer, and for sending a first bulk-read-active signal to said first CPU when data is read from said first buffer;
      a step for sending a first command-data-available signal to said second CPU when data is written to said second buffer, and for sending a first command-read-active signal to said first CPU when data is read from said second buffer;
      a step for sending a second bulk-data-available signal to said first CPU when data is written to said third buffer, and for sending a second bulk-read-active signal to said second CPU when data is read from said third buffer; and
      a step for sending a second command-data-available signal to said first CPU when data is written to said fourth buffer, and for sending a second command-read-active signal to said second CPU- when data is read from said fourth buffer.

25. A data input/output method as described in claim 24, wherein said second data processing unit further includes an external interface, and wherein:
   said first step sends bulk data by DMA transfer mode from said first data processing unit to said first buffer, and sends bulk data from said first buffer to said external interface by DMA transfer mode.

26. A data input/output method as described in claim 24, wherein said second data processing unit further includes an external interface, and wherein:
   said second step sends bulk data by DMA transfer mode from said external interface to said third buffer, and sends bulk data from said third buffer to said first data processing unit by DMA transfer mode.

27. A data input/output method as described in claim 24, wherein said first data processing unit has an external interface, and wherein:
   said first step sends bulk data by DMA transfer mode from said external interface to said first buffer, and sends bulk data from said first buffer to said second data processing unit by DMA transfer mode.

28. A data input/output method as described in claim 24, wherein said first data processing unit further includes an external interface, and wherein:
   said second step sends bulk data by DMA transfer mode from said second data processing unit to said third buffer, and sends bulk data from said third buffer to said external interface by DMA transfer mode.

29. A data input/output apparatus comprising:
   a first data input/output unit to input and/or output data;
   a second data input/output unit to input and/or output data;
   a first data processing unit having a first CPU for controlling said first data input/output unit;
   a second data processing unit having a second CPU for controlling said second data input/output unit; and
   a communication interface for data exchange between said first and second data processing units, said communication interface including:
      a first storage unit for holding data during its transfer from said first data processing unit to said second data processing unit, and
      a second storage unit for holding data during its transfer from the second data processing unit to the first data processing unit;
   wherein said first data input/output unit is effective for printing to paper, and said second data input/output unit is effective for reading image data from paper; and
   wherein said data input/output apparatus is a POS printer, said first data input/output unit is a printer for printing a check, and said second data input/output unit is a scanner for reading the image of the printed check.

* * * * *

UNITED STATES PATENT AND TRADEMARK OFFICE
CERTIFICATE OF CORRECTION

PATENT NO. : 6,907,480 B2
DATED : June 14, 2005
INVENTOR(S) : Toshiaki Takei et al.

It is certified that error appears in the above-identified patent and that said Letters Patent is hereby corrected as shown below:

Title page,
Item [56], References Cited, FOREIGN PATENT DOCUMENTS, add
-- KR 94-23287, 10/1994 --.

Column 15,
Line 37, change "star age" to -- storage --.

Signed and Sealed this

Seventh Day of March, 2006

JON W. DUDAS
*Director of the United States Patent and Trademark Office*